(12) United States Patent
Messina (10) Patent No.: US 7,396,344 B2
(45) Date of Patent: Jul. 8, 2008

(54) CLAMP

(75) Inventor: Mark Anthony Messina, Manchester, NH (US)

(73) Assignee: Gen-Probe Incorporated, San Diego, CA (US)

( * ) Notice: Subject to any disclaimer, the term of this patent is extended or adjusted under 35 U.S.C. 154(b) by 454 days.

(21) Appl. No.: 11/320,406

(22) Filed: Dec. 29, 2005

(65) Prior Publication Data

US 2006/0101622 A1 May 18, 2006

Related U.S. Application Data

(62) Division of application No. 10/651,209, filed on Aug. 29, 2003, now Pat. No. 7,017,238.

(60) Provisional application No. 60/406,686, filed on Aug. 29, 2002.

(51) Int. Cl.
*A61M 37/00* (2006.01)

(52) U.S. Cl. ........................ 604/131; 604/154

(58) Field of Classification Search ............... 604/65, 604/66, 67, 131, 154, 156, 178, 214, 250; 128/DIG. 12, DIG. 13; 24/483, 283, 484, 24/514, 515, 279
See application file for complete search history.

(56) References Cited

U.S. PATENT DOCUMENTS

| 894,216 | A | 7/1908 | Kitzmiller |
|---|---|---|---|
| 1,496,654 | A | 6/1924 | Crowther |
| 1,569,457 | A | 1/1926 | Carstens |
| 1,644,901 | A | 10/1927 | Stieglitz |
| 2,144,140 | A | 1/1939 | Batcheller |
| 2,479,634 | A | 8/1949 | Marques et al. |
| 2,561,635 | A | 7/1951 | Prochaska |
| 2,578,812 | A | 12/1951 | Kollsman |
| 3,512,380 | A | 5/1970 | Winter |
| 3,722,041 | A | 3/1973 | Munse |
| 3,916,489 | A | 11/1975 | Berger |
| 3,939,535 | A | 2/1976 | Matsuura |

(Continued)

FOREIGN PATENT DOCUMENTS

CH 269995 A 8/1950

(Continued)

*Primary Examiner*—Robert J Sandy
(74) *Attorney, Agent, or Firm*—Charles B. Cappellari; Brian A. Tollefson; Richard Wydeven (57) ABSTRACT

A clamp includes a clamp body having a spring arm with first and second ends and a deflection arm with first and second ends. The deflection arm is connected at its first end to the spring arm proximate the first end thereof, and the second end of the deflection arm is opposed spatially to a protrusion extending from the spring arm proximate the second end thereof. An actuating device engaged with the deflection arm and the protrusion can be manipulated to effect relative movement of the second end of the deflection arm away from the protrusion to cause a corresponding circumferential contraction of the spring arm. The actuating device includes a force-limiting mechanism, which limits the extent by which the second end of the deflection arm is moved away from the protrusion, thereby limiting the maximum circumferential contraction of the spring arm that can be achieved. A syringe pump assembly includes a syringe pump with a mechanized syringe and a clamp, as describe above, attached to the syringe to prevent vibration-induced rotation of the syringe.

11 Claims, 7 Drawing Sheets

U.S. PATENT DOCUMENTS

| | | |
|---|---|---|
| 4,153,056 A | 5/1979 | Silver et al. |
| 4,489,464 A | 12/1984 | Massari et al. |
| 4,505,010 A | 3/1985 | Arenhold |
| 4,592,746 A | 6/1986 | Burkholder et al. |
| 4,711,637 A | 12/1987 | Leigh et al. |
| 4,874,385 A | 10/1989 | Moran et al. |
| 4,901,963 A | 2/1990 | Yoder |
| 4,958,419 A | 9/1990 | Heckethorn et al. |
| 5,014,939 A | 5/1991 | Kraus et al. |
| D328,845 S | 8/1992 | Yoder |
| 5,219,099 A | 6/1993 | Spence et al. |
| 5,297,821 A | 3/1994 | Campo et al. |
| 5,385,558 A | 1/1995 | Cottone, Sr. et al. |
| 5,881,438 A | 3/1999 | Capanna |

FOREIGN PATENT DOCUMENTS

| | | |
|---|---|---|
| FR | 2278006 A | 2/1976 |
| GB | 1297794 | 11/1972 |

FIG. 7

CLAMP

PRIORITY CLAIM

This application claims the benefit of U.S. Provisional Application Ser. No. 60/406,686 filed Aug. 29, 2002, the contents of which are hereby incorporated by reference.

BACKGROUND OF THE INVENTION

1. Field of the Invention

This invention pertains to a clamp having a built-in load limitation mechanism and comprising a clamp body and an actuating device, constructed and arranged so that manipulation of the actuating device results in a corresponding contraction or expansion of the clamp body, thereby exerting a uniform and controlled force on a tubular structure held thereby.

2. Description of the Related Art

Figure 1:
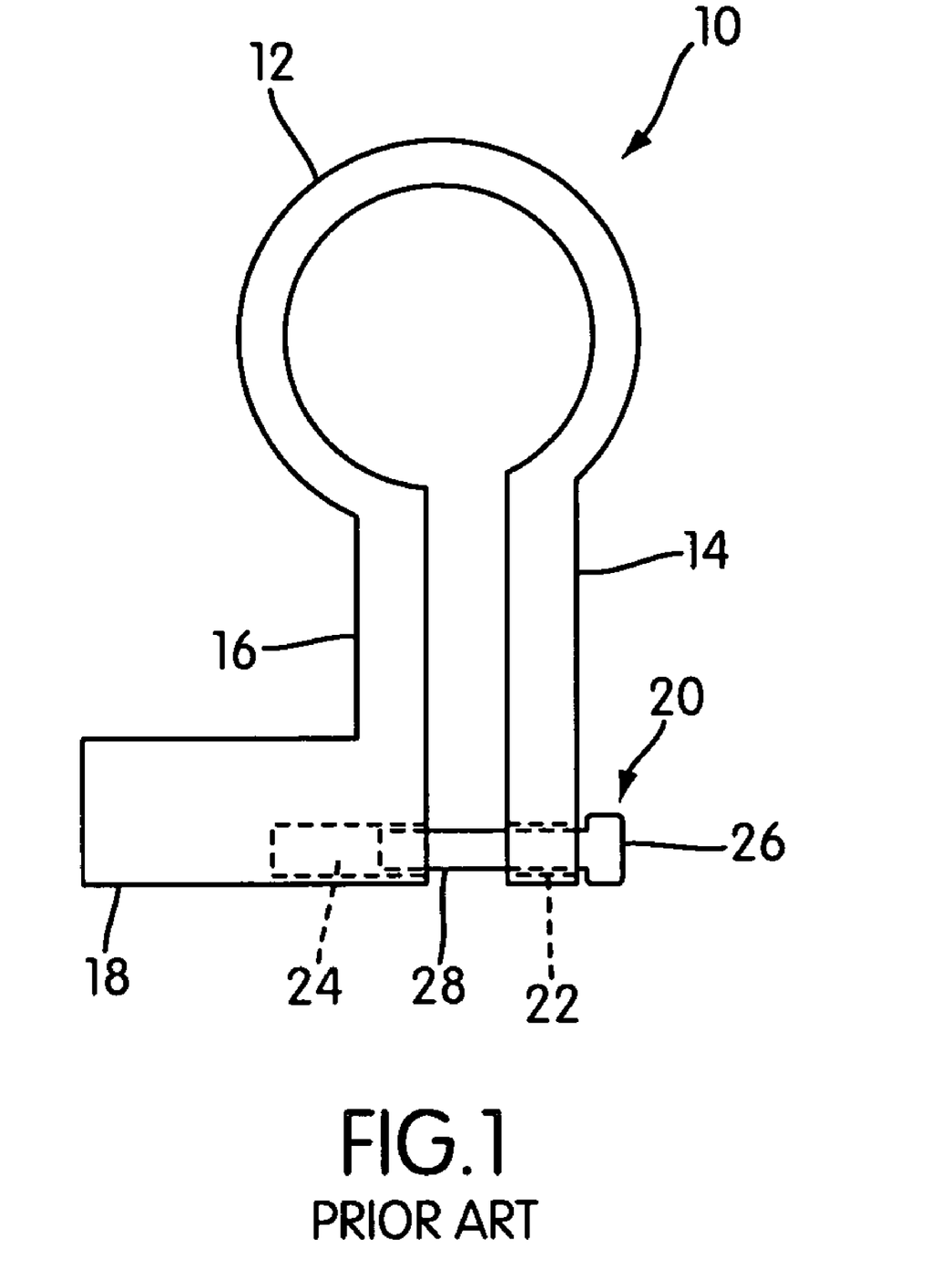
FIG. 1 illustrates a prior art clamp without a load limitation mechanism.
Figure 2:
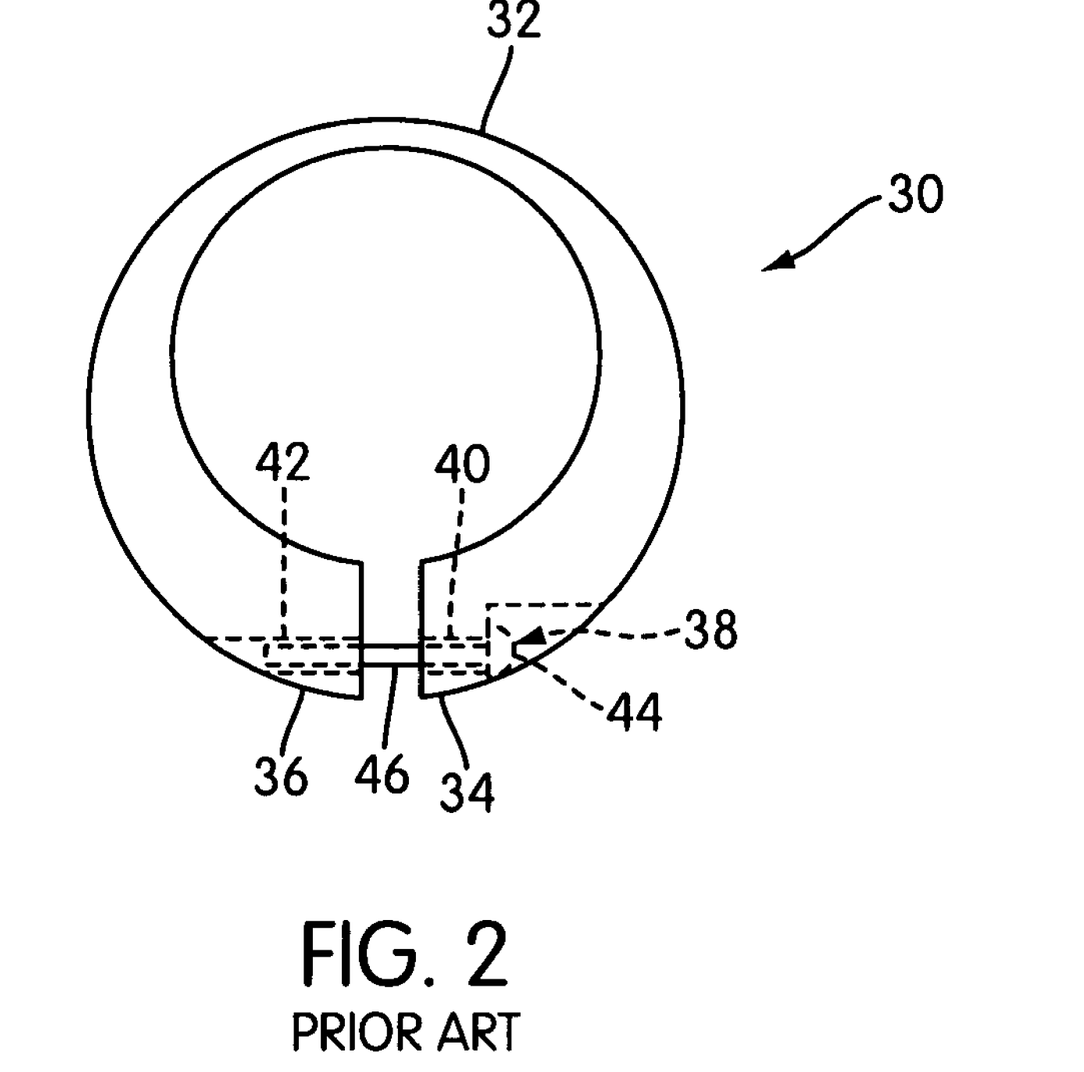
FIG. 2 illustrates a prior art circular clamp without a load limitation mechanism.

Known clamp devices suitable for holding tubes or hoses are described below and are depicted in FIGS. 1 and 2. FIG. 1 shows a prior art clamp 10 comprising a curved resilient portion 12. Extending from the curved resilient portion 12 is a first post 14 with an unthreaded hole 22 located at the free end of first post 14. Also extending from an opposite end of the curved resilient portion 12 is a second post 16, and extending from the end of the second post 16 is a projection 18. The projection 18 has a threaded hole 24 coaxially aligned with and directly opposed to the unthreaded hole 22 found at the free end of first post 14. The clamp 10 also has a screw 20 having a head 26 and threaded shaft 28. The shaft 28 of screw 20 is inserted through the unthreaded hole 22 and then screwed into the threaded hole 24. As the screw 20 is tightened into hole 24, head 26 engages post 14 forcing the two posts 14 and 16 together, thereby causing the curved resilient portion 12 to deflect in such a manner that its radius will decrease. Deflection of the curved resilient portion 12 will cause it to clamp down on any tubular structure that it may hold. Likewise, when the screw 20 is loosened the curved resilient portion 12, assuming that the aforementioned deflection is elastic, will expand as the two posts 14 and 16 move away from each other.

FIG. 2 shows a circular clamp 30 comprising a circular arc portion 32 having a first end 34 and a second end 36. An unthreaded hole 40 is provided in the first end 34 of the circular clamp 30, and a threaded hole 42, which is coaxially aligned with hole 40, is provided in the second end 36 of the circular clamp 30. Furthermore, the circular clamp 30 also has a screw 38 having a threaded shaft 46 and a head 44. The shaft 46 of screw 38 is first inserted through the unthreaded hole 40 and then screwed into the threaded hole 42. As the screw 38 is tightened, the head 44 engages the first end 34, thereby forcing the first and second ends 34 and 36 of the circular clamp 30 together. This causes the circular arc portion 32 of the circular clamp 30 to contract radially and clamp down on any tubular structure that it may hold. Likewise, when the screw 38 is loosened, the circular arc portion 32 will expand as the two ends 34 and 36 move away from each other.

While the two clamps illustrated in FIGS. 1 and 2 may be able to hold certain tubular structures, these clamps lack a mechanism for limiting the amount of force they exert on such structures. Such a force-limiting mechanism is an important feature that acts to prevent unlimited generation of clamping forces, which can cause breakage, cracking, and/or buckling of brittle or pliable tubular structures. The prior art clamps tighten down as the screw is tightened without any means for limiting the amount of contraction and force exerted by the clamp as a result of the screw being tightened. While these clamps may be suited for strong tubular structures made from materials which can sustain relatively large clamping forces without buckling or breaking, such as steel or thick plastic, they are not suited for tubular structures, such as those made of brittle materials such as glass, or pliable materials such as aluminum, which are delicate and can be easily cracked, broken or buckled if subjected to large clamping forces.

For example, syringe pumps, which are commonly used in laboratory and medical instrumentation applications, include syringe mechanisms having tubular barrels made from ground glass, a very delicate material vulnerable to cracking when subjected to point contact forces. Clamps are placed on syringes as anti-rotation devices to prevent the syringes from unthreading and losing vacuum during cycling of the pumps and vibration of the instrument. Clamps without a force limiting mechanism, however, can cause delicate syringe barrels to crack or deform, resulting in broken barrels, leaks, and wasted material.

For the foregoing reasons, there is a need for a clamp apparatus which evenly distributes the force it exerts on tubular structures and also has a built-in load limitation mechanism, which enables it to hold delicate tubular structures in a snug fashion without causing breakage or cracking of the structure.

SUMMARY OF THE INVENTION

In accordance with the foregoing and other objects, the present invention provides a clamp that includes a spring arm, a deflection arm, a protrusion, and an actuating device, which is suitable for clasping tubular structures by uniformly distributing the load and also limiting the amount of load exerted on the tubular structure. The spring arm extends generally in an arc and has a first end and a second end. The protrusion projects from the spring arm proximate the second end thereof. The deflection arm is connected at a first end thereof to the first end of the spring arm and has a second end disposed in spaced relation with respect to the protrusion. The deflection arm is constructed and arranged such that relative movement of the protrusion and the second end of the deflection arm away from each other causes a corresponding circumferential contraction of the spring arm and relative movement of the protrusion and the second end of the deflection arm toward each other causes a corresponding circumferential expansion of the spring arm. The actuating device is engaged with both the protrusion and the second end of the deflection arm and is constructed and arranged to, upon manipulation thereof, effect relative movement of the protrusion with respect to the second end of the deflection arm to thereby cause a corresponding circumferential contraction or expansion of the spring arm.

The invention also includes, according to another aspect thereof, a syringe pump assembly including a mechanized syringe and an anti-rotation clamp secured to the syringe and constructed and arranged to prevent rotation of the syringe by contacting a structure adjacent to the syringe. The syringe includes a barrel, a plunger disposed within the barrel for reciprocating movement therein, and a motor operatively coupled to the plunger for effecting mechanized movement of the plunger. The clamp includes a clamp body and an actuating device. The clamp body comprises a spring arm extending generally in an arc and having a first end and a second end, a protrusion projecting from the spring arm proximate the second end thereof, and a deflection arm connected at a first end thereof to the first end of the spring arm and having a second end disposed in spaced relation with respect to the protrusion.

The deflection arm is constructed and arranged such that relative movement of the protrusion and the second end of the deflection arm away from each other effects a corresponding circumferential contraction of the spring arm, and relative movement of the protrusion and the second end of the deflection arm toward each other effects a corresponding circumferential expansion of the spring arm. The actuating device is engaged with the protrusion and the deflection arm and is constructed and arranged to, upon manipulation thereof, effect relative movement of the protrusion and the second end of the deflection arm with respect to each other to thereby cause a corresponding circumferential contraction or expansion of the spring arm.

With these and other objects, advantages and features of the invention that may become hereinafter apparent, the nature of the invention may be more clearly understood by reference to the following detailed description of the invention, the appended claims, and the drawings attached hereto.

BRIEF DESCRIPTION OF THE DRAWINGS

The invention will be described in detail with reference to the following drawings, in which like features are represented by common reference numbers and in which.

DETAILED DESCRIPTION OF THE PREFERRED EMBODIMENT

Figure 3:
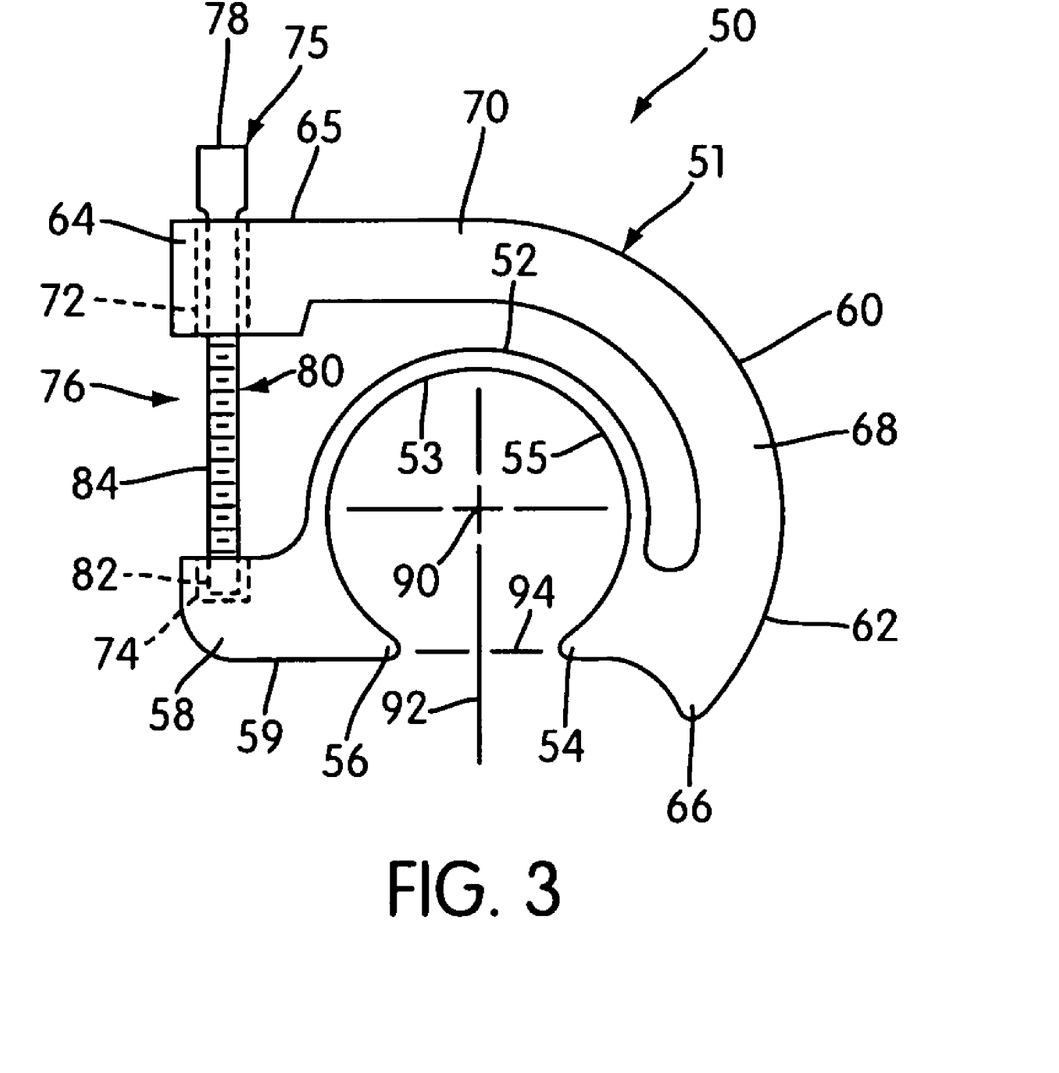
FIG. 3 is a plan view of a clamp according to a preferred embodiment of the present invention.
Figure 4:
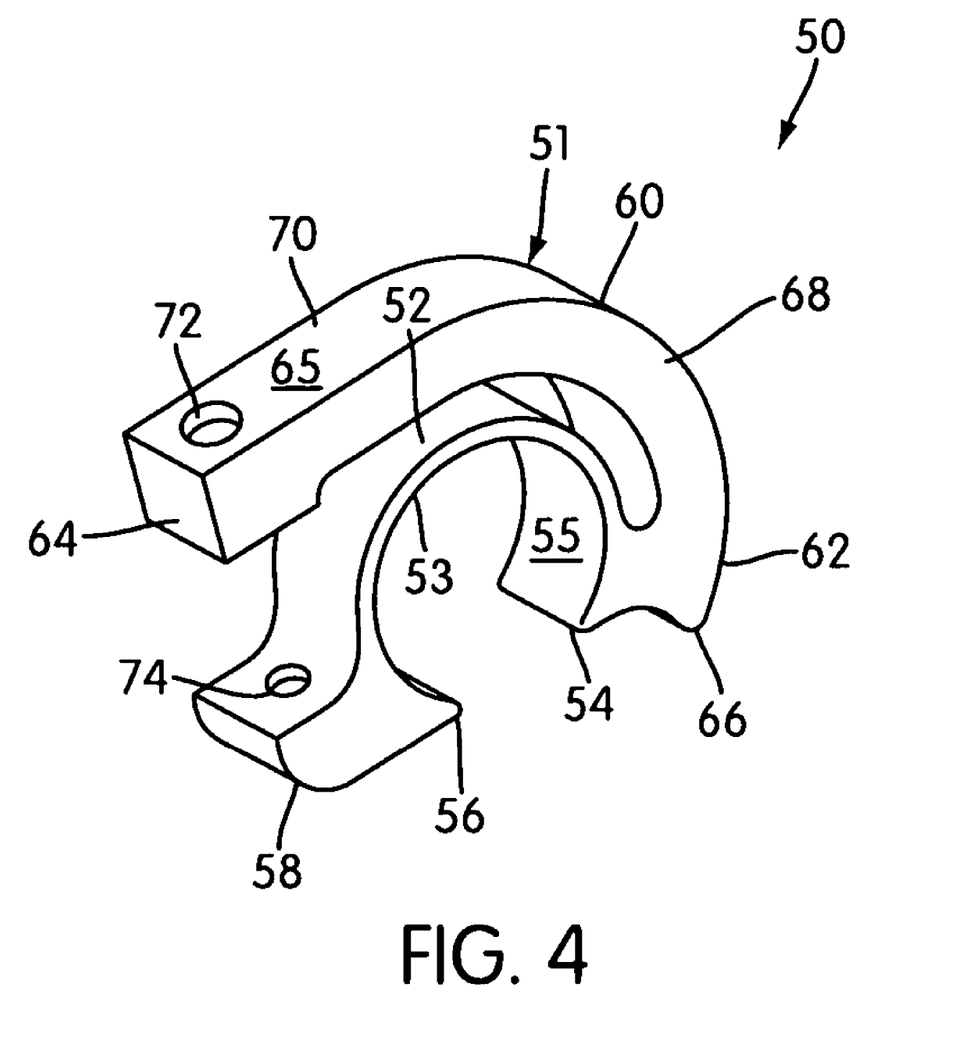
FIG. 4 is a perspective view of the clamp according to the preferred embodiment of the present invention.

A clamp according to a preferred embodiment of the present invention is generally indicated by reference number 50 in FIGS. 3 and 4. The clamp 50 includes a clamp body 51 and a force limited actuating device 76 operatively mounted on the clamp body 51 for selectively tightening or loosening the clamp 50, as will be described in more detail below.

The clamp body 51 has a spring arm 52, which extends generally in an arc and has a first end 54 and a second end 56 connected by an angular extent 53 of at least a portion of a full circle having a substantially constant radius of curvature. The angular extent 53 preferably has at least about 250 degrees of arc and must be less than 360 degrees (and therefore has a gap between its ends) so that the spring arm 52 can be contracted. The actual angular extent will depend on the application for which the clamp will be used. In a preferred embodiment, extent 53 has a range of about 270-300 degrees of arc. A protrusion 58 is formed adjacent the second end 56 of the spring arm 52.

Clamp body 51 further includes a deflection arm 60 which extends partially around an outer (i.e., convex) side of the spring arm 52 and has a straight portion 70, a curved portion 68, a first end 62, and second end 64. In a preferred embodiment, the curved portion 68 of the deflection arm has substantially the same curvature as the spring arm 52, and the straight portion 70 is substantially parallel to an imaginary line 94 connecting first end 54 of spring arm 52 to second end 56 when the clamp body 51 is in a free, non-clamping state. The curved portion 68 preferably has an extent of about 150 degrees±10-20 degrees of arc.

The deflection arm 60 is co-joined at the first end 62 thereof to the first end 54 of the spring arm 52, and is arranged so that the second end 64 of the deflection arm 60 is disposed in spaced relation with respect to the protrusion 58. In addition, a ridge 66 may be formed on a bottom surface of the first end 62 of the deflection arm 60. The purpose of ridge 66 will be explained below in the context of application of the clamp 50 on a syringe pump.

Because of the arrangement of the deflection arm 60 on the convex side of the spring arm 52, the configuration of the clamp body 51 is such that one side of the clamp, i.e., the lower side below surface 59 in the orientation in which the clamp is presented in FIG. 3, is substantially devoid of structure. Therefore, the clamp can be installed on tubular structures that are adjacent to interfering structures that would otherwise inhibit use of a clamp, such as those shown in FIGS. 1 and 2, which includes structure that would completely surround the tubular structure on which it is installed.

The clamp body 51 is preferably machined from a single piece of extruded 6061 aluminum. Other materials are also contemplated, including an injection molded nylon or polypropylene. The inner surface 55 of the spring arm 52 may be etched or coated with a rubber (e.g., EPDM) to increase the friction between the inner surface 55 and the tubular structure that is being clamped and to aid in evenly distributing the clamping force exerted by the clamp via spring arm 52 on a clamped tubular structure, especially where the tubular structure has or is expected to have surface irregularities.

A threaded through hole 72 is provided in the second end 64 of the deflection arm 60. An unthreaded blind hole 74 or recess, is formed in the protrusion 58 that is opposed to and coaxially aligned with hole 72, adjacent the second end 56 of the spring arm 52. In a preferred embodiment, holes 72 and 74 (engagement means) are arranged so that a line connecting them is substantially parallel to an imaginary axis line 92 extending through the center of curvature 90 of the spring arm 52 and bisecting a gap between first and second ends 54, 56 of the spring arm 52.

An actuating device (means) is generally indicated at reference number 76. In general, the actuating device 76 is a component of clamp 50 engaged with both the protrusion 58 and the deflection arm 60 and constructed and arranged to selectively effect relative movement of the second end 64 of the deflection arm 60 and the protrusion 58 toward or away from each other. In the context of the present disclosure, the actuating device is engaged with the protrusion 58 or the deflection arm 60 if it is in contact with, connected to, interlocked with, or otherwise cooperatively associated with the protrusion or the deflection arm so as to be able to effect relative movement of the protrusion with respect to the deflection arm. In the preferred embodiment, the actuating device 76 is a threaded rod engaged with the deflection arm 60 near its second end 64 and the protrusion 58. Most preferably actuating device 76 is a thumb screw 75 with a knurled head 78 and a shaft 80, where the radius of the head 78 is larger than the radius of the threaded through hole 72. The shaft 80 includes an upper threaded portion 84 extending from head 78 and has at its lower end, an unthreaded bald tip 82. It is not required that tip 82 be unthreaded.

Unlike the prior art clamps, such as those shown in FIGS. 1 and 2, in which a clamp-tightening screw is inserted first through an unthreaded hole and then into a threaded hole, in the clamp of the present invention, screw 75 is inserted first through the threaded hole 72 formed in the second end 64 of the deflection arm 60. The threaded hole 72 guides the screw 75 until the tip 82 is seated in the hole 74 formed in the protrusion 58. The radius of the unthreaded blind hole 74 is greater than the radius of the tip 82, so that the tip 82 can enter the unthreaded blind hole 74 and freely rotate as the screw 75 is screwed into the threaded through hole 72.

The protrusion 58, spring arm 52, deflection arm 60, and actuating device 76 are constructed and arranged such that manipulation of the actuating device 76 will effect relative movement of the protrusion 58 with respect to the second end 64 of the deflection arm 60 which effects a corresponding circumferential contraction or expansion of the spring arm 52. Contraction in the spring arm 52 created by the actuating device 76 exerts a clamping force on an object, such as a tubular structure held within its radius, that is generally equally distributed via the inner surface 55 of the spring arm 52. The clamp 50 also includes a load limitation mechanism that regulates the maximum amount of force exerted on a tubular structure by the clamp body 51, as will be described in more detail below.

The length of the screw 75 is preferably such that when the tip 82 is seated in the blind hole 74, and while the protrusion 58 and the second end 64 of the deflection arm 60 are in their normal, undeflected positions, the head 78 of screw 75 is not in contact with a top surface 65 of the deflection arm 60. As the screw 75 is further rotated, the second end 64 of the deflection arm 60 advances with respect to the threaded portion 84 of the shaft 80 toward the head 78, while engagement of the tip 82 with the blind hole 74 of the protrusion 58 prevents movement of the protrusion 58 with respect to the screw shaft 80. It will be appreciated that the blind hole 74 could dispensed with in an embodiment of the clamp in which engagement of the tip 82 with the protrusion 58 would prevent the movement of the protrusion 58 with respect to the screw shaft 80. The relative movement of the second end 64 and the protrusion 58 away from each other effects a circumferential contraction of the spring arm 52, thereby applying a clamping force onto a tubular structure on which the clamp is installed. The clamping force can be released by reversing the rotational direction of the screw 75, thereby causing the second end 64 of the deflection arm to translate along the shaft 80 away from the screw head 78 so as to permit the second end 64 and the protrusion 58 to move toward their normal, undeflected positions.

Unlike prior art clamps, such as those shown in FIGS. 1 and 2, where the actuating device forces two portions of a clamp body together to cause contraction of the clamp, the present invention pushes the protrusion 58 and the second end 64 of the deflection arm 60 away from each other in order to cause contraction of the clamp. As the protrusion 58 and the second end 64 of the deflection arm 60 are moved relatively away from each other, there will be a corresponding circumferential contraction of the spring arm 52, which is connected at the first end 54 thereof to the protrusion 58. Consequently, the circumferential contraction of the spring arm 52 reduces the inner radius of the cylindrically shaped spring arm 52 which then exerts a clamping force on a tubular structure.

Also unlike the prior art clamps, the actuating device 76 of the clamp 50, in cooperation with the clamp body 51, provides a mechanism for limiting and controlling the amount of load the clamp 52 is able to exert on a tubular structure. As the screw 75 is turned and the second end 64 of the deflection arm 60 advances up the shaft 80, the head 78 of the screw 75 comes into contact with the top surface 65 of the deflection arm 60 proximate the second end 64. Consequently, the second end 64 cannot be farther advanced up the shaft 80, and, as a result, the protrusion 58 and the second end 64 of the deflection arm 60 cannot be moved further away from each other. Thus, circumferential contraction of the spring arm 52, and the associated clamping force exerted thereby, is limited. Accordingly, the load limitation mechanism effects a limit on the maximum amount of clamping force that can exerted on a tubular structure by the clamp 50. As will be appreciated by persons of ordinary skill in the art, the maximum amount of force that can be exerted by the clamp 50 can be adjusted depending on the length of the shaft 80 of the screw 75.

The load limitation mechanism of the clamp 50 enables the clamp 50 to be used to hold fragile or pliable tubular structures securely without causing breakage or buckling of the structure.

In an alternative embodiment of the present invention, the clamp body 51 can be modified by reversing the placement of the threaded through hole 72 and the unthreaded blind hole 74. That is, an unthreaded blind hole can be provided in the second end of the deflection arm 60, and a threaded through hole can be provided in the protrusion 58, adjacent the second end 56 of the spring arm 52. As with the preferred embodiment, the unthreaded blind hole is generally opposed to and coaxially aligned with the threaded through hole.

To cause contraction of the spring arm 52 of this alternative arrangement, the screw 75 is inverted and inserted through the threaded through hole formed in the protrusion 58 and advanced until the tip 82 of the screw 75 is seated in the blind hole formed near the second end 64 of the deflection arm 60. Tightening of the clamp can thereafter be effected by continuing to rotate the screw thereby causing the protrusion 58 to advance with respect to the threaded portion of the screw toward the screw head while engagement of the tip with the deflection arm near the second end 64 thereof prevents movement of the deflection arm 60 relative to the screw shaft. The corresponding relative movement of the protrusion 58 and the second end 64 away from each other will result in the circumferential contraction of the spring arm 52, and the spring arm 52 will exert an evenly distributed, controlled force on the tubular structure. Furthermore, the maximum amount of clamping load that can be exerted by the contracting spring arm 52 will be limited when the head 78 of the screw 75 comes into contact with a bottom surface 59 of the protrusion 58. The spring arm can be expanded, and the clamping force can be released, by merely reversing the direction of the screw 75 to permit the protrusion 58 and the second end 64 of the deflection arm 60 to move relatively toward each other and elastically return to their original relative positions.

This alternative embodiment would not be desirable in an application in which the clamp is installed such that the bottom surface 59 of the clamp body 51 abuts, or is closely adjacent to, a wall or other structure that would interfere with a screw head.

Figure 5:
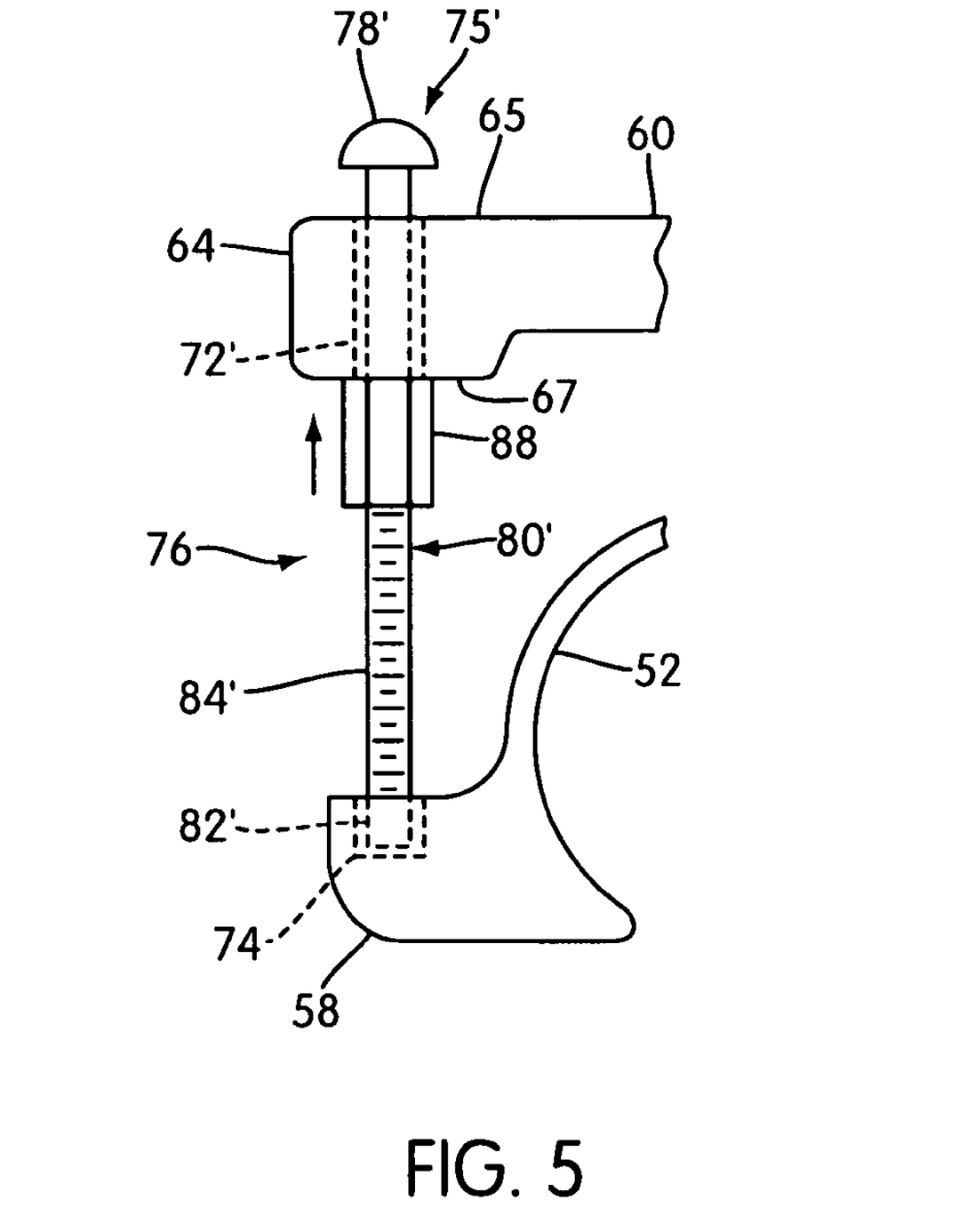
FIG. 5 is a partial view showing an alternative embodiment of the clamp of the present invention.

In another alternative embodiment of the present invention shown in FIG. 5, a nut and screw arrangement can be employed as the actuating device 76, such that the clamp body 51 itself would not require any threaded holes. A screw 75', having a head 78' and a shaft 80' with a threaded portion 84' and a tip portion 82', is inserted through hole 72' formed near the second end 64 of the deflection arm 60, and the tip 82' is seated in the blind hole 74 formed in the protrusion 58. A nut 88 is rotated about the threaded shaft portion 84', and the length of the screw 75' is such that the head 78' does not initially contact the top surface 65 proximate the second end 64 of the deflection arm 60 when the second end 64 and the protrusion 58 are in their normal, undeflected positions. The nut 88 is advanced up the threaded portion 84' of the shaft 80' until it contacts a bottom surface 67 proximate the second end 64 of the deflection arm 60. Further rotation of the nut 88, while holding the screw 75' against rotation, will advance the nut 88 further up the shaft 80' in the direction of the arrow toward the head 78'. The movement of the nut 88 forces the second end 64 toward the head 78', while engagement of the tip 82' with the blind hole 74 prevents movement of the protrusion 58 with respect to the screw shaft 80'. This relative movement of the second end 64 and the protrusion 58 away from each other effects a circumferential contraction of the spring arm 52, thereby applying a clamping force against a tubular structure on which the clamp is installed. The clamping force can be released by reversing the direction of the nut 88 so as to permit the second end 64 and the protrusion 58 to move toward their normal, undeflected positions.

The alternate embodiment shown in FIG. 5 also includes a load limiting feature in that the nut 88 can only be advanced toward the head 78' until the top surface 65 of the deflection arm 60 contacts the head 78', thereby limiting the maximum clamping force that can be generated.

The alternative embodiment of FIG. 5 can be modified by providing screw threads in the blind hole 74 in the protrusion 58 and by providing threading on the screw shaft 80' all the way to the tip 82'. The screw 75' can then be secured tightly into the blind hole 74, so that the screw 75' will be secured against rotation as the nut 88 is rotated to advance it toward the head 78'. Screw 75' could also be secured by other means, such as, for example, welding or adhesive.

Figure 6:
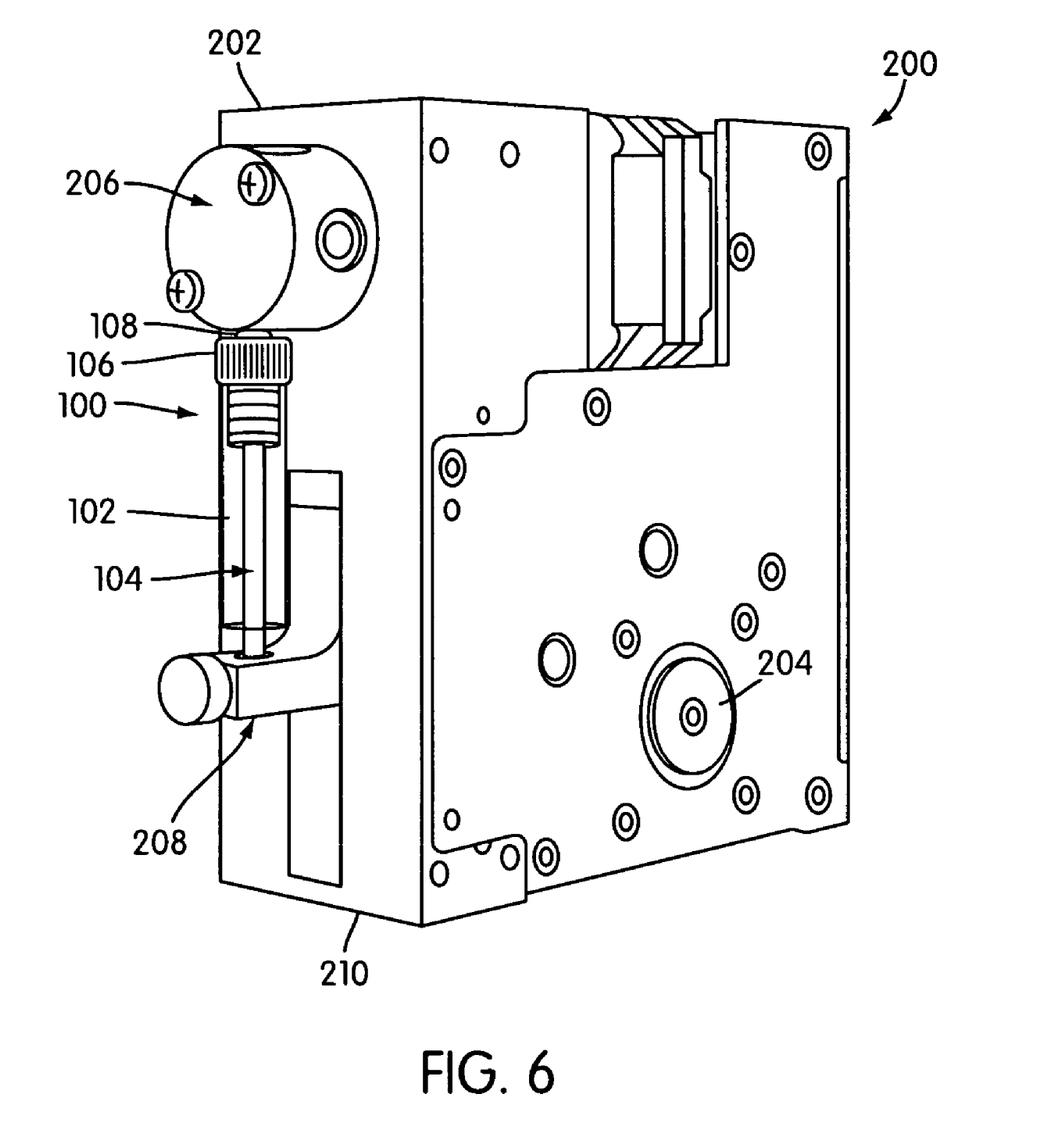
FIG. 6 is a perspective view of a syringe pump, for which the present invention can be employed as an anti-rotation device.

FIG. 6 show an exemplary syringe pump 200 of the type on which the clamp 50 of the present invention might be employed. Syringe pump 200 includes a housing 202, a motor 204 contained within the housing 202, a valve assembly 206, a syringe 100 operatively coupled to the valve assembly 206, and a movable arm 208 operatively coupled to both the motor 204 and the syringe 100. The syringe 100 includes a glass barrel 102, a plunger 104 disposed within the barrel 102, and a hub 106 with a projecting nipple 108 (partially shown) which is threaded for connecting the barrel 102 with the valve assembly 206. Pumping is effected by movement of the plunger 104 by the movable arm 208 powered by the motor 204. Exemplary syringe pumps on which the clamp of the present invention can be installed as an anti-rotation device include the model XP3000 Modular Digital Pump available from Cavro Scientific Instruments, Inc. of San Jose, Calif., and the PSD/4 syringe pump, model 7858-04 available from Hamilton Company of Reno, Nev.

As was explained briefly in the Background section above, repeated cycling of the plunger 104 during operation of the syringe pump 200 and/or vibration of an instrument on which the syringe pump 200 is installed can cause the barrel 102 and/or the hub 106 to rotate, thereby causing the nipple 108 to be loosened with respect to the valve assembly 106.

Figure 7:
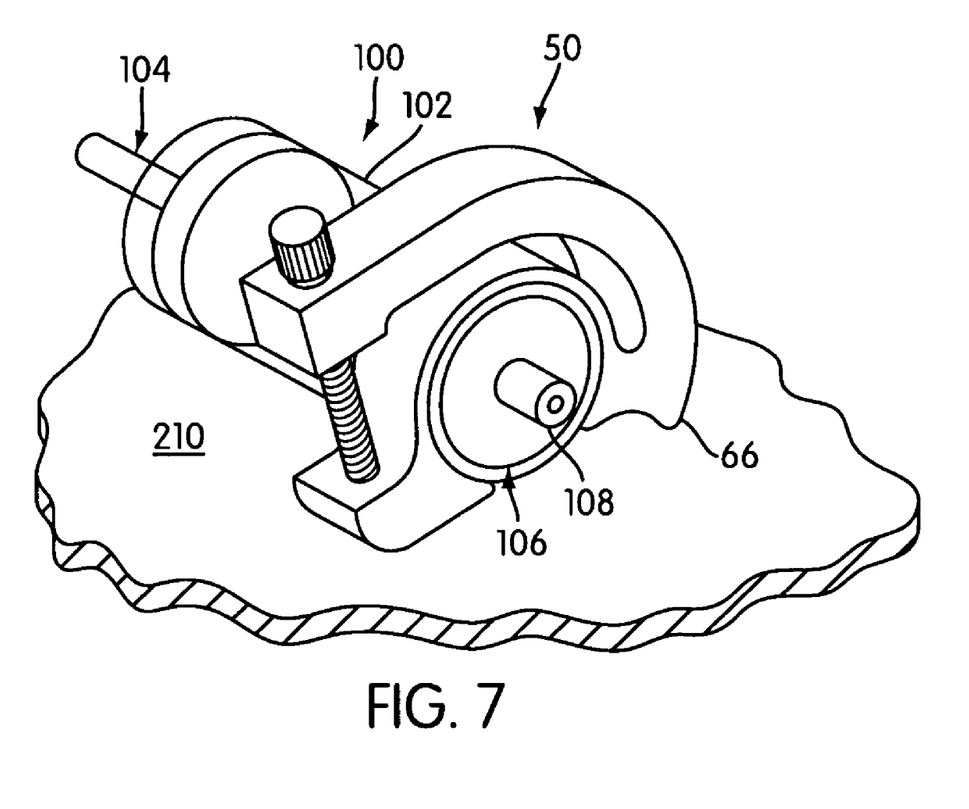
FIG. 7 is a perspective view of a clamp installed on a syringe of a syringe pump.

FIG. 7 shows an application of the clamp 50 according to the present invention whereby the clamp 50 is installed on a syringe 100 of a syringe pump. Clamp 50 is secured to the syringe 100, preferable to the hub 106, and the clamp 50, and more specifically ridge 66, contacts a surface 210 to prevent rotation of the syringe 100. Surface 210 may be an end wall of the housing 202 of the pump 200, some other component of pump 200, or some other structure of the instrument on which the pump 200 is installed that is adjacent to the syringe 100.

It can be appreciated from FIG. 7 that the arrangement of the clamp 50 allows it to be installed on a tubular structure, such as syringe 100, which is closely adjacent to a structure (e.g., surface 210) which would otherwise preclude, or at least make very difficult, use of a conventional clamp, such as either of the clamps shown in FIGS. 1 and 2.

While the invention has been described in connection with what are presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

What is claimed:

1. A syringe pump assembly comprising:
    a mechanized syringe including a barrel, a plunger disposed within said barrel for reciprocating movement therein, and a motor operatively coupled to said plunger for effecting mechanized movement of said plunger; and
    an anti-rotation clamp secured to said syringe and constructed and arranged to prevent rotation of said syringe by contacting a structure adjacent to said syringe, said anti-rotation clamp comprising:
    a clamp body comprising:
        a spring arm extending generally in an arc having a first end and a second end;
        a protrusion projecting from said spring arm proximate said second end thereof; and
        a deflection arm connected at a first end thereof to said first end of said spring arm and having a second end disposed in spaced relation with respect to said protrusion, said deflection arm being constructed and arranged such that relative movement of said protrusion and said second end of said deflection arm away from each other effects a corresponding circumferential contraction of said spring arm and relative movement of said protrusion and said second end of said deflection arm toward each other effects a corresponding circumferential expansion of said spring arm; and
    an actuating device engaged with said protrusion and said deflection arm and constructed and arranged to, upon manipulation thereof, effect relative movement of said protrusion and said second end of said deflection arm with respect to each other to thereby cause a corresponding circumferential contraction or expansion of said spring arm.

2. The syringe pump assembly of claim 1, wherein said spring arm has an angular extent of about 270-300 degrees between said first and second ends thereof.

3. The syringe pump assembly of claim 1, wherein said deflection arm includes a curved portion extending from said first end thereof to an intermediate position along said deflection arm and a straight portion extending from said intermediate position to said second end of said deflection arm.

4. The syringe pump assembly of claim 1, wherein said clamp body comprises a single, integral piece of material.

5. The syringe pump assembly of claim 4, wherein said material is selected from the group comprising: aluminum, nylon, and polypropylene.

6. The syringe pump assembly of claim 1, wherein said actuating device comprises a threaded rod extending between and engaged with said deflection arm, proximate said second end thereof, and said protrusion.

7. The syringe pump assembly of claim 6, wherein said threaded rod extends through a first hole formed through said deflection arm proximate said second end thereof.

8. The syringe pump assembly of claim 6, wherein said threaded rod comprises a screw having a head with a threaded shaft extending therefrom and a tip at an opposite end of said threaded shaft from said head, and wherein said first hole is threaded so as to be cooperable with said threaded shaft of said screw, wherein said screw has a length such that when said screw is inserted through said first hole and said tip of said screw is engaged with said protrusion, said head of said screw is not in contact with said deflection arm, and wherein rotation of said screw causes said deflection arm to travel along said threaded shaft toward said head of said screw, while engagement of said screw tip with said protrusion prevents movement of said protrusion relative to said screw thereby effecting said relative movement of said second end of said deflection arm with respect to said protrusion.

9. The syringe pump assembly of claim 8, further comprising a blind hole formed in said protrusion within which said tip of said screw is seated when said tip of said screw is engaged with said protrusion.

10. The syringe pump assembly of claim 1, wherein said actuating device includes a load limitation feature constructed and arranged to prevent the relative movement of said second end of said deflection arm away from said protrusion from exceeding a predetermined amount to thereby limit the amount of corresponding circumferential contraction.

11. The syringe pump assembly of claim 8, wherein said actuating device includes a load limitation feature constructed and arranged to prevent the relative movement of said second end of said deflection arm away from said protrusion from exceeding a predetermined amount to thereby limit the amount of corresponding circumferential contraction, said load limitation feature comprising the head of said screw which is constructed and arranged to contact said deflection arm to limit the distance by which said deflection arm can advance along said threaded shaft during rotation of said screw.

* * * * *